N. SABO.
MOTION PICTURE OPTICAL SYSTEM.
APPLICATION FILED DEC. 9, 1919.
1,409,974.
Patented Mar. 21, 1922.
2 SHEETS—SHEET 1.
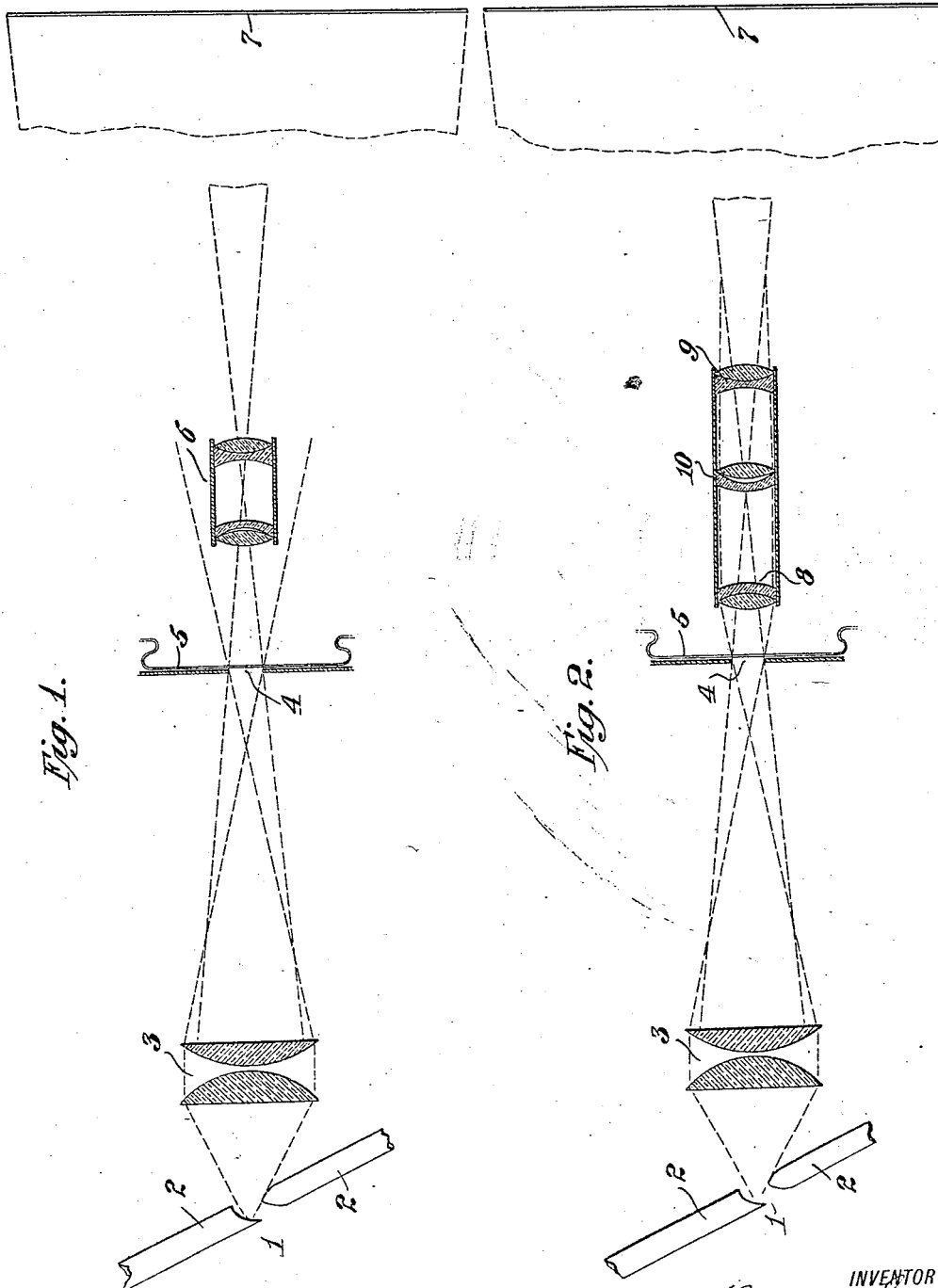

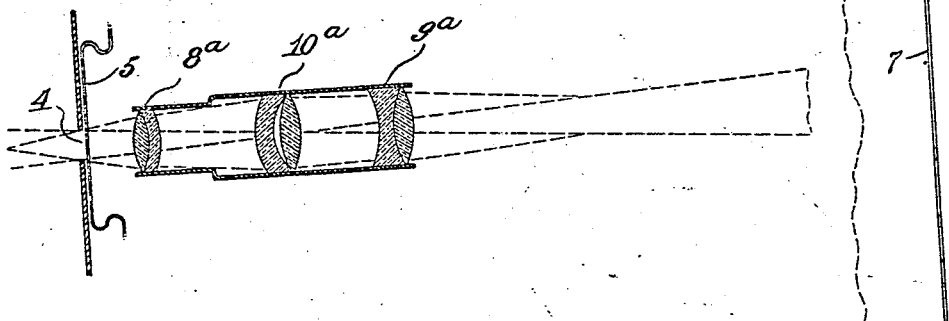
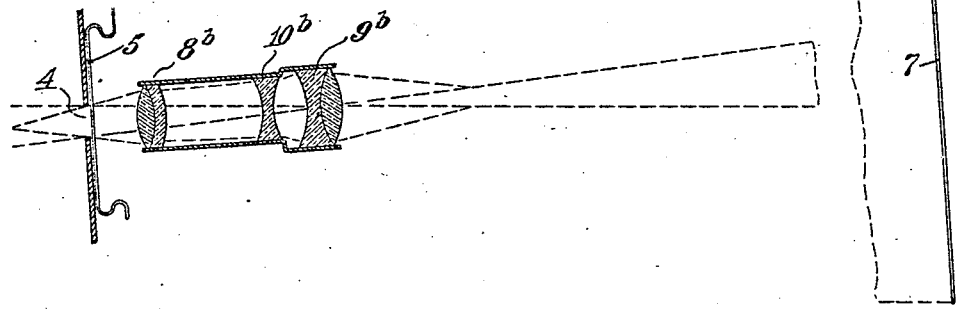

UNITED STATES PATENT OFFICE.

NICHOLAS SABO, OF NEW YORK, N. Y.

MOTION-PICTURE OPTICAL SYSTEM.

1,409,974.  Specification of Letters Patent.  Patented Mar. 21, 1922.

Application filed December 9, 1919. Serial No. 343,545.

*To all whom it may concern:*

Be it known that I, NICHOLAS SABO, a citizen of Hungary, (having taken out his first naturalization papers for citizen of the United States,) residing at 547 West 186th Street, New York city, in the county of New York and State of New York, have invented certain new and useful Improvements in Motion-Picture Optical Systems, of which the following is a specification, reference being had therein to the accompanying drawing.

This invention relates to motion picture optical systems and has for its object to obtain the maximum and most uniform illumination of the projected image on the screen.

The optical systems now in vogue for motion picture apparatus, comprise a source of light usually formed by two carbons to produce an arc, a condenser for condensing the light rays from the arc, a film aperture through which the condensed rays pass to the film, a projecting lens system which receives the rays after they pass through the film, and a screen on which the image of the film is projected.

After the rays pass through the film aperture, they immediately diverge, and unless the projecting lens system is such that the widely diverging rays are caught and caused to pass through the system, these rays are lost and a diminution in the illumination of the projected image results. It has been attempted to obviate this fault as far as possible by establishing a definite comparatively long distance between the condenser lens and the film aperture so as to reduce the angle of dispersion to a minimum, the longer the distance the smaller the angle of dispersion, but this relation of the condenser to the film aperture necessitates such a distance from the source of light to the condenser, on account of the focal length of the condenser necessary to focus at the film, that the condenser will not receive the greatest amount of light, and consequently a considerable loss takes place at this point. In order to secure the greatest amount of light from the arc, the latter should be placed as close to the condenser as possible, but this condition requires a short focus condenser with a correspondingly large angle of dispersion and greater divergence of the rays after they pass through the film, so that the advantage gained by increasing the distance between the condenser and film to reduce the divergence of the rays, was offset by the disadvantage of the increased distance between the source of light and the condenser.

My invention aims to take advantage of the short focus condensers and the consequently short distance between the source of light and the condenser to secure the greatest amount of light in the condenser, and this without loss of light due to the greater divergence of the rays at the film, and my invention consists in an improved form of projecting lens which is so constructed and disposed in relation to the film apertures and film, that practically all of the widely diverging rays will be received by the projecting lens, and the image caused to be projected on the screen with a maximum of brightness and uniformity of illumination.

In the accompanying drawings:

Fig. 1 is a diagrammatic view of a motion picture optical system such as is now universally employed.

Fig. 2 is a similar view of such system equipped with my improved projecting lens.

Fig. 3 is a similar view showing a modified form of the projecting lens.

Fig. 4 is a similar view showing still another modification.

Referring to the drawings:

Referring to Fig. 1, 1 designates the source of light usually in the form of an arc produced by the carbons 2; 3 the condenser lens system known as the "condenser;" 4 the film aperture; 5 the film; 6 the projecting lens system, and 7 the screen on which the image is projected. As is well known to those skilled in the art, the rays of light from the arc pass through the condenser and are focussed at the film aperture, and after passing through the aperture and film, the light rays diverge, part of them passing through the projecting lens system by which the image is projected on the screen.

The projecting lens system as heretofore commonly used, comprises as shown in this figure, two pairs of achromatic lenses, the first lens of the first pair being positive and the second negative, and the first lens of the second pair being negative and the second positive. In practice, it is found that, due to the distance which the projecting lens system must be placed from the film to properly focus on the screen, a great number of the diverging rays from the film aperture will not be intercepted by the lens and will be consequently lost, with resulting diminution of the degree of illumination of the projected image on the screen. It has been attempted in practice to avoid the loss of light rays at this point by employing a comparatively long focus condenser lens system so as to reduce the angle of dispersion, but this requires an increase in the distance between the source of light and the condenser, with consequent loss of light on the condenser so that the gain in light at one point was offset by the loss at another point, and little or no increase of illumination of the image was obtainable.

My invention is concerned with an improved form of projecting lens system by means of which, with a short focus condenser and the source of light placed close to the condenser to secure the maximum amount of light, practically all of the widely diverging rays passing the film aperture and film will be intercepted and caused to pass through the projecting lens system, thereby securing the maximum degree of illumination of the projected image.

I have shown in Figs. 2, 3 and 4 three different forms of projecting lens systems designed to accomplish this result, but it will be understood that other forms may be employed without departing from the limits of my invention, provided the action will be substantially as above described.

Referring to Fig. 2, my improved projecting lens system comprises three pairs of lenses, a back pair 8, a front pair 9, and a middle pair 10 mounted in a sustaining tubing. The back lens is placed at such distance from the film aperture and film, usually about one and one-half inches, that it will intercept the rays coming at the greatest angle, and this lens is of such focal length as to bend these rays into parallelism and cause them to pass through the other lenses of the system. As a result, the more widely diverging rays, which would otherwise be lost, are utilized in obtaining the maximum of illumination of the projected image, and this, while employing a short focus condenser and without loss of light from the arc.

In Fig. 3, the same principle of action is present as in Fig. 2, except that the back lens 8ª is of longer focal length than the corresponding lens of Fig. 2, and the middle and front lenses 10ª and 9ª are of larger numerical aperture than the corresponding lenses of Fig. 2. The diverging rays after passing lens 8ª will be still diverging, but to a smaller angle, and these rays will be intercepted by the other lenses 10ª and 9ª due to their greater numerical aperture. This arrangement allows for a better correction for the back lens 8ª.

The construction shown in Fig. 4 is also within the principle of the other forms of the invention, the front lens 9ᵇ being of larger numerical aperture than the back lens 8ᵇ and being of shorter focal length. The middle lens 10ᵇ is a negative lens in order to lengthen the equivalent focal length of the whole combination. This form of projecting lens system is very useful for long focal length lenses.

A characteristic of my improved projecting lens is that the back lens of the system occupies a practically constant distance from the film aperture and film, so as to intercept the rays diverging at the wider angles, and this without regard to the focal length of the lens system as a whole; and this back lens is at such distance from the film aperture and film, is of such focal length, and of such numerical aperture, that it will intercept the widely diverging rays and keep them within the confines of the lens tubing, and in combination with the other lens or lenses of the system, will cause practically all the rays to be utilized in projecting and illuminating the image with a maximum of brightness on the screen.

The improved action characteristic of the improved lens system above described, cannot be realized by merely placing the known projecting lens closer up to the film aperture to intercept more rays of light, because then the lens would fail to project the image on the screen at all as the focus would be entirely destroyed. Nor would it be practical to reconstruct the present known two-combination lens to give a proper focus with the back lens close enough to the film aperture to intercept more rays, as a change of this character would require a longer distance between the two lenses of the combination, and this would require, in order to maintain the same proper focus, that the individual lenses be of less focal length than the focal length of the whole combination, which of course would be wholly impracticable for obvious reasons. Nor can my invention be realized by merely increasing the diameter of the known forms of projecting lenses, since this would be impracticable for many reasons, mainly, on account of the uneven definition due to the impairment of the effect of the rays passing through the extreme edges of the larger lenses.

Actual test by experts of the most popular projecting lens in use today under a definite set of conditions, showed 52% of light passing the film to be lost after passing the projecting lens, some of the rays diverging before they reached the lens, some hitting the lens tubing, and some being lost on account of the glass surfaces. Under the same set of conditions employing my improved lens projecting system, only 21% of light passing the film was lost after passing the projecting lens, the loss being due to extra glass surfaces; and a very small fraction of the light rays hit the lens tubing.

Due to the form and construction of my improved lens system, no change is required in the standard form and relation of the parts of the apparatus, there being no increase in diameter of the lenses or change in their relation to the present type of apparatus which would require any reconstruction or, change thereof.

Having thus described my invention, what I claim is:

1. In a moving picture optical system, the combination of a source of light, a short focus condenser disposed relatively to the source of light to intercept the maximum amount of light therefrom, a gate having a film aperture at such distance from the condenser that the smallest concentration point of the light rays will substantially coincide with said aperture, a projecting lens system comprising a back lens, a front lens, and a middle lens, spaced apart from each other, the said back lens being a positive lens and being of such focal length, numerical aperture, and at such distance from the film aperture that it will intercept practically all of the widely diverging light rays caused by the wide angle of dispersion due to the short focus condenser, and will act to deflect said rays to the other lenses.

2. A projecting lens for moving picture machines adapted to project the light rays passing the film aperture, said lens comprising a combination-lens system consisting of a back combination-lens, a front combination-lens, and a middle combination-lens sustained in spaced relations to each other, the back lens being a positive lens and being of such numerical aperture and focal length in relation to the numerical apertures and focal lengths of the front and middle lenses, that the system as a whole may be placed so close to the film aperture that the back lens will intercept practically all of the widely diverging light rays and will act to deflect said rays within the confines of the other lenses of the system.

3. A projecting lens for moving picture machines adapted to project the light rays passing through the film aperture, said lens comprising a combination-lens system consisting of a positive back combination-lens, a positive middle combination-lens and a positive front combination-lens sustained in spaced relations to each other, the said back lens being of such numerical aperture and focal length in relation to the numerical apertures and focal lengths of the front and middle lenses, that the system as a whole may be placed so close to the film aperture that the back lens will intercept practically all of the widely diverging light rays and will act to deflect said rays within the confines of the other lenses of the system.

4. A projecting lens for moving picture machines adapted to project the light rays passing the film aperture, said lens comprising a three lens system consisting of a back lens, a middle lens and a front lens sustained in spaced relations to each other, the back lens being a positive lens and being of such numerical aperture and focal length in relation to the numerical apertures and focal lengths of the front and middle lenses, that, regardless of the focal length of the system as a whole, the latter may be placed so close to the film aperture that the back lens will intercept practically all of the widely diverging light rays passing through the aperture and will deflect said rays within the confines of the other lenses of the system.

5. A projecting lens system for motion picture machines adapted to project the light rays passing the film aperture, said system comprising a back lens, a front lens, and a middle lens mounted in spaced relations to each other in a lens tubing, the said back lens being a positive lens and being of such numerical aperture and focal length in relation to the numerical apertures and focal lengths of the other lenses, that it may be disposed at such practically constant distance from the film aperture, regardless of the focal length of the system as a whole, as to intercept practically all of the widely diverging rays passing the aperture and deflect said rays to the other lenses without striking the lens tubing.

In testimony whereof, I have affixed my signature hereto.

NICHOLAS SABO.